United States Patent [19]

Cousseau

[11] Patent Number: 4,719,449
[45] Date of Patent: Jan. 12, 1988

[54] TRANSPORT APPARATUS FOR TRANSPORTING PART-CARRYING MEMBERS TO VARIOUS WORK STATIONS AND FOR READING DATA ENCODED ON SAID PART-CARRYING MEMBER

[75] Inventor: Joseph Cousseau, Cerizay, France

[73] Assignee: Jice Automation, Chantonnay, France

[21] Appl. No.: 897,265

[22] Filed: Aug. 18, 1986

[30] Foreign Application Priority Data

Oct. 1, 1985 [FR] France ................. 85 14514

[51] Int. Cl.⁴ ............................................. H03M 1/26
[52] U.S. Cl. .................. 340/347 P; 33/1 PT; 250/231 SE; 340/347 M
[58] Field of Search ............ 340/347 P, 347 M; 250/231 SE; 33/1 PT; 73/861.33

[56] References Cited

U.S. PATENT DOCUMENTS 2,934,824  5/1960  Braybrook et al. ......... 340/347 P X
3,408,483  10/1968  Zuse ..................................... 235/436
3,594,735  7/1971  Furlong et al. ............ 340/347 M X Primary Examiner—T. J. Sloyan
Attorney, Agent, or Firm—Murray and Whisenhunt

[57] ABSTRACT

Each movable member (1) has a disk (6) which is mounted free to rotate about an axis (5) and which includes an annular area (7) of radial stripes (8) together with three concentric coding and read areas (9, 10, 11) having holes therethrough. The read station is equipped with a compressed air blast nozzle (15) for rotating each disk (6) presented thereto, together with a branch (17A) having suitable detectors (18, 19, 20) for detecting said holes and connected to electronic decoding circuits.

4 Claims, 3 Drawing Figures

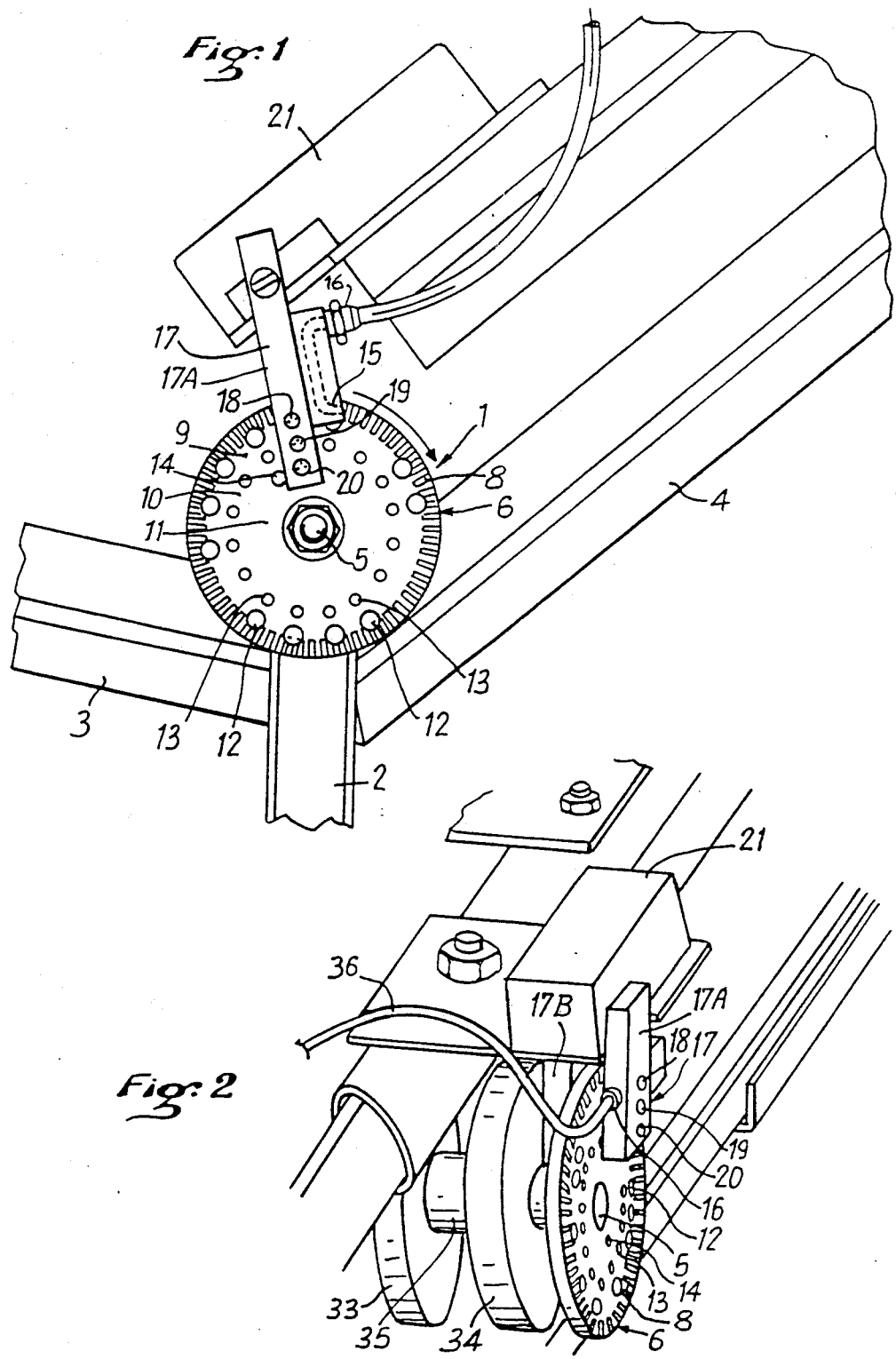

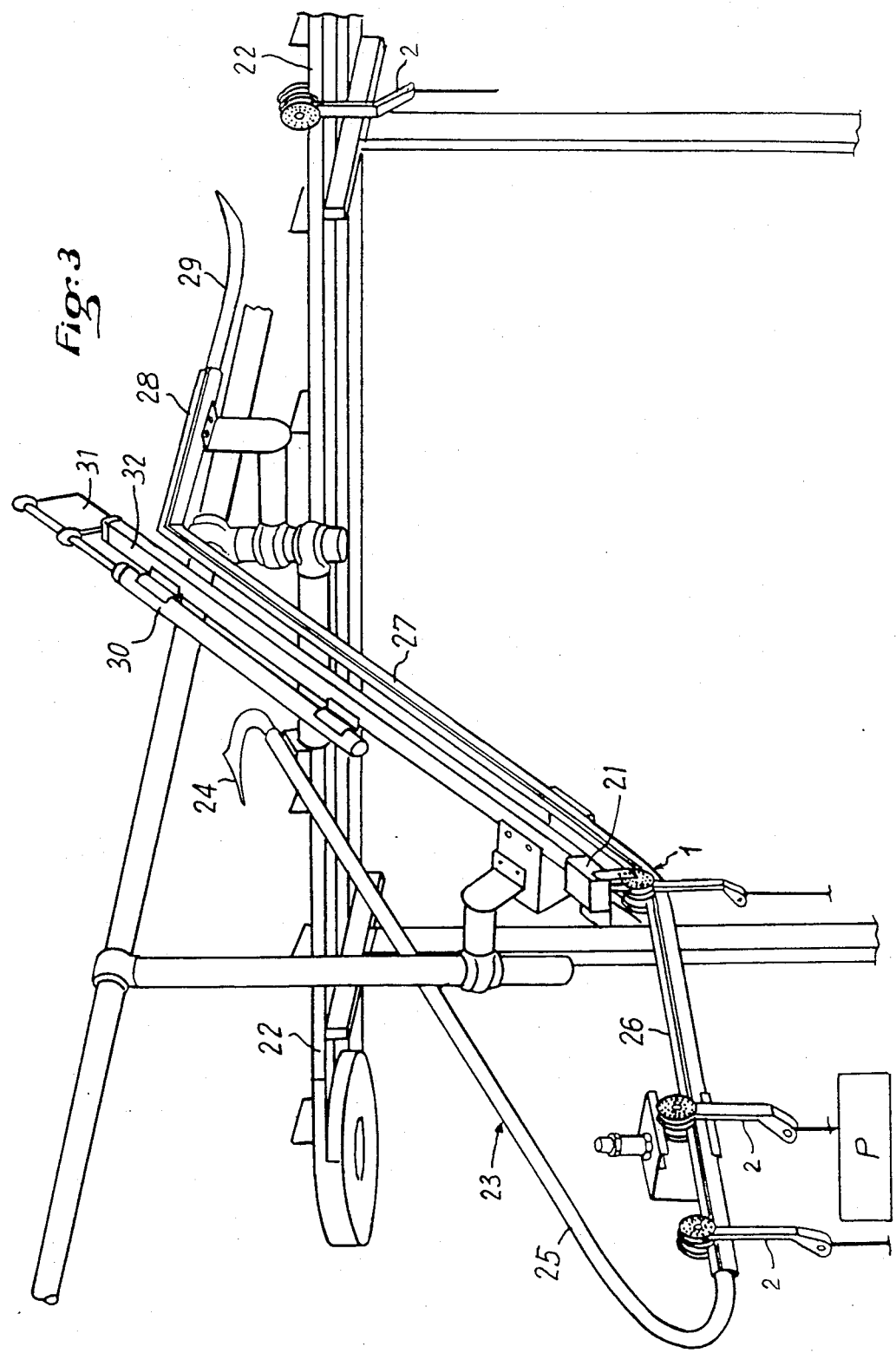

TRANSPORT APPARATUS FOR TRANSPORTING PART-CARRYING MEMBERS TO VARIOUS WORK STATIONS AND FOR READING DATA ENCODED ON SAID PART-CARRYING MEMBER

The invention relates to a system for use in giving a coded identity number or sign to a movable member which is generally used for carrying work pieces, and for enabling the identity number or sign to be read at a suitably equipped reader station in order to enable said movable member to be subsequently directed towards a given location, for example to a work station.

BACKGROUND OF THE INVENTION

Numerous coding and reading systems are already described in the technical literature and are known in practice.

The present invention seeks to provide a system which is particularly simple to implement, which is cheap to perform and use, and which is nevertheless remarkably reliable in operation.

SUMMARY OF THE INVENTION

The present invention provides a system comprising:

firstly, on each movable member, a disk designed to be mounted free to rotate about an axis, and secondly a shaft supported by the movable member and carrying said disk, the disk having on at least one of its main faces a first annular area concentric with its axis for receiving rotary drive, said area having substantially radial stripes therein, and a plurality of annular coding and reading areas of different diameters disposed concentrically about the axis and provided with detectable points; and secondly, at each reading station, a pressurized gas blast nozzle is disposed to send a jet of gas in a direction transverse to the stripes of the first area of the disk of each member which stops at said read station, and at least one read branch which is supported to be disposed generally radially facing the coding and reading areas of the same disk, said branch carrying appropriate detectors in correspondence with each of the coding and reading areas of the disk, with said detectors being operatively connected, in a manner known per se to electronic decoding circuits.

In one embodiment of the invention, each read station includes a fork having two parallel branches which are spaced apart to enable a disk to be freely disposed therebetween; one of said branches carries emitters of radiation, preferably infrared radiation, and the other of said branches carries phototransistors which constitute a portion of the electronic decoding circuits. Preferably, there are three coding and reading areas: a first area having a hole for sending a read start bit; a second area having a succession of holes for sending clock bits; and a third area having a succession of coding holes.

In a particularly advantageous embodiment of the invention for use in an installation including at least one pneumatic actuator for executing a movement when the disk of each movable member is read, the blast nozzle is connected to the air exhaust orifice of said actuator.

BRIEF DESCRIPTION OF THE DRAWINGS

A preferred embodiment of the invention is described, by way of example, with reference to the accompanying drawings, in which:

FIG. 1 is a side view of a read station with a movable member disk being read;

FIG. 2 is a perspective view of the same read station; and

FIG. 3 is a general view of an installation including a read station of the kind shown in FIGS. 1 and 2 and a set of movable members each of which is provided with a coding disk.

MORE DETAILED DESCRIPTION

FIG. 1 shows a read station for movable members 1 each equipped with a hanger rod 2 from which pieces of clothing to be made up into garments may be suspended, for example. Each movable member 1 takes up an accurately defined position in the read station, which position is defined in the present example by an angle provided between a guide rail 3 which slopes downwardly at a small angle and a guide rail 4 which slopes upwardly at a steep angle.

Each movable member 1 has a shaft 5 on which a disk 6 is mounted free to rotate. One of the main faces of the disk has a first annular area 7 which is concentric about the shaft 5 and which is preferably situated around the periphery of the disk in order to have as large a diameter as possible. A series of radial stripes or grooves 8 are provided in this area. Thereafter, closer to the axis 5 there are three successive annular areas respectively labelled 9, 10, and 11. These areas are concentric with successively smaller diameters and they are used for coding and reading. The area 9 immediately following the first area 7 has a succession of holes 12 passing therethrough, and the number of holes and the spaces therebetween are representative of an identity number. The next area 10 closer to the axis of the shaft 5 has a succession of holes 13 passing therethrough at a constant pitch and these holes correspond to a clock rate suitable for reading. Each hole 12 through the area 9 lies on the same radial line as a corresponding clock pulse hole 13 in the area 10. The inner-most area 11 has a single hole 14 passing therethrough and situated on the same radial line as one of the clock pulse holes 13 in the area 10, which radial line may optionally also have an identity-encoding hole 12 in the area 9. The hole 13 in the area 10 is an index hold for sending a signal that reading is to begin as the disk 6 rotates about the shaft 5.

A nozzle 15 is installed in fixed and permanent manner to the read station and is connected by a fitting 16 to a source of compressed air. A fork 17 having two branches 17A and 17B which extend on either side of each disk 6 arriving at the read station are also fixed in permanent manner to the read station.

The nozzle 15 is directed to blow air in a direction transverse to the radial stripes 8 and nearly tangential to the surface of the disk in order to cause the disk to rotate about the shaft 5. The disks 6 are caused to rotate at a substantially constant speed of rotation which is suitable for read operations by adjusting the rate at which air is blown through the nozzle 15, using an adjusting screw (not shown).

One of the branches 17A of the fork 17 situated on one side of the disks 6 carries detectors which are radially disposed relative to the shaft 5, and these detectors are constituted by respective phototransistors 18, 19, and 20 each of which is disposed to correspond with one of the areas 9, 10, or 11 having holes. The phototransistors are connected to conventional electronic circuits (not shown) which are included in a decoding apparatus 21.

The opposite branch 17B of the fork 17 situated on the on the other side of the disk 6 carries infrared radiation emitters (not visible on the drawings) which are likewise disposed radially relative to the shaft 15 and each corresponds with a respective one of the phototransistors 18, 19, and 20. The phototransistors receive the emitted radiation each time a hole through the disk 6 allows the radiation to pass.

Naturally other types of detector could be provided as could other means on the disks for interacting therewith. For example, each disk 6 could be provided in its coding and reading areas 9, 10, and 11 with magnetic tabs and the detectors in the branch 17A could be heads sensitive to the passage of the magnetic tabs. The solution described herein is the preferred solution but it is not the only possible solution.

The nozzle 15 may be installed on one of the branches of a fork analogous to the fork 17 and having a second branch situated opposite the other main face of the disks 6. This second branch could be fitted with a second compressed air blast nozzle for blowing compressed air on radial stripes provided on said other main face of the disks.

The operation of the system in accordance with the invention is described below.

Each disk 6 on each movable member 1 is provided in its area 9 with holes 12 with the number and positions of the holes 12 being particular to that disk and serving to identify it.

When the movable member 1 is stopped in the read station, the compressed air from the blast nozzle(s) 15 causes the disk 6 to rotate. The hole 14 in the area 11 applies a start read signal during a full rotation of the disk to the corresponding detector 20 by allowing the passage of radiation from the associated emitter. Reading takes place through the identity holes 12 in the area 9 when the corresponding detector 18 receives radiation from the associated emitter. The holes 13 in the area 10 send clock pulses which define the speed of rotation of the disk 6. The disk can be made of plastic material; and the holes 12 for encoding the identity of the disk are preferably in the form of a 16-bit binary code. Reading takes place repetitively over several successive rotations of the disk 6, e.g. six rotations, during a total period of about four seconds, for example. Once the movable member 1 stopped at the read station has been identified, it is then directed towards the next work station where it is to stop.

FIG. 3 shows an example of the above-described system in accordance with the invention being used.

The movable members 1 are moved along a general transporter 22 having a plurality of work stations P installed along its length. Each work station P is associated with a branch line 23 which comprises, in succession, an inlet switching blade 24, a descending guide path 25, a work station stop length 26 which is at a small angle to the horizontal, a raising guide path 27, a descending guide path 28, and a switching blade 29 for reinsertion on the general transporter 22. The read station is situated at the bend between the stop length 26 and the raising guide path 27. The movable members are raised after their identity has been read as explained above by means of a pneumatic actuator which is shown in part and which controls a raising device 31 contained in a sheath 32. This device is not described in greater detail as it does not form a part of the present invention. However, with reference to the present invention, it can be seen in FIG. 2 that the shaft 5 carrying the disk 6 on each moving member 1 also carries two wheels 33 and 34 which are separated by a gap 35. The raising device includes a stop which is retractable while descending and which moves into the gap 35 in order to drive the movable member 1 upwardly, thereby raising it. The actuator 30 lowers the raising device 31 when a movable member 1 is stopped in the read station. The exhaust from the actuator 30 while it is lowering the raising device has an air orifice which is connected by means of a flexible pipe 36 to the air inlet fitting 16 on the blast nozzle. No additional source of power is required to perform a read operation.

Naturally, any other actuator in an installation which is required to move when a read operation is to take place could have its exhaust orifice connected to the blast nozzles 15. However, using the actuator which is going to remove the movable members 1 from the read station is a particularly apt solution since this actuator necessarily comes into operation at exactly the moment that an identity read operation is required.

I claim:
1. A transport apparatus for transporting part-carrying members to various work stations and for reading encoded data from said part-carrying members, said apparatus comprising:
a first plurality of movable part-carrying members, each said movable part-carrying member having a shaft mounted thereon, each said shaft having a disc mounted on said shaft, said disc being rotatable about said shaft, each said disc having a pair of main faces, at least one of said main faces having a first annular area concentric with said shaft having substantially radial grooves therein and a second plurality of annular coding and reading areas of different diameters disposed concentrically about said shaft and provided with detectable points;
a general transporter, having a third plurality of work stations therealong, for movably supporting said first plurality of movable part-carrying members, each work station having
a descending guide path for moving said movable part-carrying members from said general transporter to said work station,
a stop length, connected to said descending guide path, for stopping said movable part-carrying member at said work station,
a raising guide path for returning said movable part-carrying to said general transporter from said work station,
a connection connecting said stop length to said raising guide path,
a read station situated at said connection,
a pneumatic actuator for moving a raising device to and fro along said raising guide path and having an air orifice for exhaust of air when said raising device is moved towards said read station;
wherein said read station comprises
a pressurized gas blast nozzle for sending a jet of gas in a direction transverse to said radial grooves of said first area of said disc for a movable part-carrying member stopped at said read station, said gas blast nozzle having an air inlet fitting connected by a pipe to said air orifice of said pneumatic actuator,
at least one read branch disposed generally radially facing said disc of said movable part-carrying member stopped at said read station, said read branch carrying detectors in correspondence with said coding and reading areas of said disc for reading information encoded thereon.

2. A system according to claim 1, wherein each disk has three concentric annular coding and reading areas, including a first area with a single detectable point for emitting a read start signal, a second area having a succession of detectable points for emitting clock signals, and a third area having a succession of detectable points for identity encoding.

3. A system according to claim 1, wherein the detectable points are constituted by holes passing through the disk, the detectors in the read branch being constituted by phototransistors mounted on the said branch so as to be opposite said encoding and reading areas on one side of the disk while an opposite branch extends over the other side of the disk and carries radiation emitters suitable for emitting radiation to be detected by the phototransistors through said holes.

4. A system according to claim 1, wherein each disk is provided with radial grooves on both of its main opposite faces, and wherein two compressed air blast nozzles are provided on either side of the disk of each movable member stopped in a read station.

* * * * *